United States Patent Office 3,294,748
Patented Dec. 27, 1966

3,294,748
CURING AGENTS FOR EPOXY RESINS
Dow A. Rogers, Jr., Wilkins Township, Allegheny County, Newton N. Goldberg, Pittsburgh, and Clarence L. Zeise, Jr., Monroeville, Pa., assignors to Westinghouse Electric Corporation, East Pittsburgh, Pa., a corporation of Pennsylvania
No Drawing. Filed May 23, 1962, Ser. No. 196,891
9 Claims. (Cl. 260—47)

This invention relates in general to thermosetting epoxy resin compositions which remain in the uncured state indefinitely at room temperature and yet rapidly cure to a hard, tough, infusible state at moderate elevated temperatures. More particularly, this invention relates to novel compositions of matter comprising epoxy resins and a curing or cross-linking agent of dicyandiamide in combination with certain dihydrazide compounds and to laminated structural members employing the novel composition of matter as an impregnant.

Epoxy resins, frequently referred to as glycidyl or diglycidyl ethers, are complex polymeric reaction products of polyhydric phenols with polyfunctional halohydrins and/or glycerol dichlorohydrin. The products thus obtained contain terminal or vicinal epoxy groups. Typical polyhydric phenols useful in the preparation of epoxy resins include resorcinol and various bisphenols resulting from the condensation of phenol with aldehydes and ketones such as formaldehyde, acetaldehyde, acetone, methylethylketone and the like. A typical epoxy resin is the reaction product of epichlorohydrin and 2,2-bis(p-hydroxy phenol) propane. A large number of epoxy resins are disclosed in the Greenlee Patents 2,585,115 and 2,589,245. Many of these resins are readily available commercial products under proprietary designations.

Epoxy resins ordinarily require the addition of cross-linking agents or other curing agents before they can be cured to a hard, infusible, resinous product. A large number of hardening agents are known in the art. Among them are dicyandiamide and polyfunctional organic compounds known as dihydrazides, the dihydrazide hardener compounds have the formula:

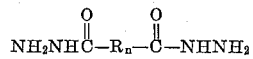

wherein R is a divalent hydrocarbon radical and $n$ is selected from the group consisting of zero and the integer 1.

It is a general object of this invention to provide novel reactive epoxy resin compositions containing a specific combination of hardening agents. The combination of hardening agents provides the resinous composition with an unusual and desirable combination of attributes including prolonged shelf life, long pot life at advanced temperatures, the capability of being heated to operating temperatures and subsequently cooled substantially without curing, rapidly curing to hard, infusible products at moderate temperatures and the capability of producing laminated structural materials with excellent high temperature physical properties.

A more specific object of this invention is to provide a novel reactive epoxy resin composition containing in combination, dicyandiamide and at least one dihydrazide.

A further object of this invention is to provide laminated structural materials employing the novel resinous composition as an impregnant and having excellent high temperature physical properties after the resin has been cured.

Further objects and advantages of the invention will become apparent as the following description proceeds and features of novelty which characterize the invention will be pointed out in particularity in the claims annexed to and forming a part of this specification.

It has now been discovered that when dihydrazides and dicyandiamide are employed, in combination, as a curing or hardening agent, a superior heteropolymerized epoxide is produced.

Epoxy resins may be characterized by reference to their epoxy equivalent, the epoxy equivalent of pure epoxy resins being the mean molecular weight of the resin divided by the mean number of epoxy radicals per molecule, or in any case the number of grams of epoxy resin equivalent to one mol of the epoxy group or one gram equivalent of epoxide. For the purposes of this invention, epoxy resins having an epoxy equivalency of 100 to 550 are preferred. However, it is to be understood that the advantages attending the use of the novel combination of hardening compounds are not influenced by the type of epoxy employed. Any of the known glycidyl ethers may be employed.

The preparation of dicyandiamide is known and disclosed in the prior art. The preparation of the dihydrazides, suitable for use according to this invention, is also known in the art and is, for example, described in U.S. Patent No. 2,847,395. It is to be understood that dihydrazides, satisfactory for use in this invention have the formula:

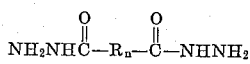

wherein R is a divalent hydrocarbon radical and $n$ is selected from the group consisting of zero and the integer 1.

The invention will now be illustrated by means of a number of specific examples which employ the described dihydrazides and dicyandiamide, alone and in combination, as hardening or curing agents for epoxy resins. It will be apparent from the examples that the proportions of dihydrazide to dicyandiamide may vary from about 9:1 to 1:9, by weight.

*Example I*

A liquid epoxy resin blend was prepared by mixing together 60 parts of a Dow Chemical Company epoxy resin designated DER 332LC, having an epoxy equivalent of 150–175 and 40 parts of a Jones-Dabney epoxy resin designated Epi-Rez 520, having an epoxy equivalent of 450–525. Ten parts, by weight, of isophthalic dihydrazide was added as a finely divided suspension and thoroughly admixed with the resin blend. The composition was cured for 16 hours at 290° F. The Shore "D" durometer hardness of the cured, infusible resin was measured at various temperatures with the following results:

| Temperature, ° C.: | "D" durometer hardness value |
|---|---|
| 26 | 80 |
| 65 | 79 |
| 85 | 75 |
| 105 | 62 |
| 138 | 49 |
| 180 | 49 |

*Example II*

A curing or hardening composition consisting of 9 parts of isophthalic dihydrazide and 1 part of dicyandiamide, as a finely divided suspension, was added to the epoxy resin blend of Example I and thoroughly admixed therewith. These samples were also cured for 16 hours at 290° F. The Shore "D" durometer hardness was measured at various temperatures with the following results:

| Temperature, ° C.: | "D" durometer hardness value |
|---|---|
| 26 | 81 |
| 65 | 80 |
| 85 | 80 |
| 105 | 77 |
| 138 | 62 |
| 180 | 63 |

*Example III*

A curing or hardening composition consisting of 5 parts of isophthalic dihydrazide and 2 parts of dicyandiamide, as a finely divided suspension, was added to the epoxy resin blend described in Example I. The samples were cured for 16 hours at 290° F. The Shore "D" durometer hardness was measuretd at various temperatures with the following results:

| Temperature, ° C.: | "D" durometer hardness value |
|---|---|
| 27 | 76 |
| 81 | 74 |
| 100 | 69 |
| 180 | 48 |

One of the simplest and most effective means of measuring the degree of cure and the cross-linking density of thermoset compositions generally and epoxy resins specifically, is by measuring the hardness values of the cured composition at various temperatures, particularly at elevated temperatures.

From the foregoing hardness values, it will be apparent to those skilled in the art that there is a surprising and profound effect on the degree of cure and cross-linking density of the cured epoxy when dicyandiamide is used in combination with isophthalic dihydrazide. It should be noted, for example, that the hardness of the material prepared in Example II is significantly higher at 180° C. than the hardness of the material prepared in Example I. It should also be noted that the hardness of the material prepared in Example III is substantially identical to the hardness of the material prepared in Example I, with a higher hardness retention at 100° C. Of course, a smaller amount of curing or hardening agent, by weight, was employed in Example III. It has also been found that at least 20 parts per hundred of the isophthalic dihydrazide alone would be required to accomplish the results shown in Example III and that dicyandiamide alone does not give an adequate cure at the temperatures prescribed. Similar results are obtained when, for example, sebacic dihydrazide or adipic dihydrazide is substituted for the isophthalic dihydrazide of the foregoing examples. From the foregoing, it is apparent that R may be a divalent radical selected from the group consisting of phenylene and alkylene radicals. It should also be understood that finely divided filler materials, as for example wood flour, silica, calcium carbonate and the like may be employed in the composition in a manner known to those skilled in the art.

We now turn to the aspect of this invention which covers plastic laminates. As is well-known in the art, a base material such as paper, cotton cloth, asbestos sheet or the like is first impregnated with a resin. Phenolic, melamine, silicone and epoxy resins are examples of resins which are typically employed as impregnants. After impregnation, the resin filled base material is dried and/or partially cured to a solid but fusible state and cut into sheets. The sheet material is laid-up in stacks and the resin is cured to the solid, insoluble and infusible state by the application of heat and pressure in a laminating press. At least one sheet of the base material is employed.

The properties of the base material and the properties of the cured resin influence the properties of the finished laminate. As noted hereinabove, epoxy resins have been employed in the production of plastic laminates. It has now been discovered, however, that epoxy laminates with superior properties may be produced by employing the novel epoxy resin composition containing dicyandiamide and at least one dihydrazide, in combination, as the curing or hardening agent. The examples below will serve as illustrations of the surprising advantages attending the use of the novel composition of this invention.

The examples employ four different resin compositions. The same glass cloth base material was employed for each sample laminate. The samples were constructed by the same technique and molded under essentially identical conditions. The post-cure conditions were also identical. Thus, the results depend on the properties of the cured resin itself. It is to be understood that all proportions referred to hereinabove and hereinbelow are proportions by weight.

A resin blend was prepared by mixing 60 parts of an epoxy resin, having an epoxy equivalent of 180–195 (Shell Chemical Co., Epon 828) with an epoxy resin having an epoxy equivalent of 450–525 (Jones-Dabney Co., Epi-Rez 520). Dicyandiamide and a dihydrazide were added in various amounts, either singly or in combination, to the resin blend as outlined below. A glass cloth base material was pre-impregnated with the composition. Twelve plies of the base material were employed to form a laminate ⅛ inch thick after curing in a press. The laminates were pressed between plates to prevent warping and post-cured for 1 hour at 140° C., 2 hours at 150° C. and 4 hours at 160° C.

RESIN-CATALYST SYSTEM

| Example No. | Parts, Dicyandiamide | Parts, Isophthalic Dihydrazide |
|---|---|---|
| IV | 10 | 0 |
| V | 0 | 10 |
| VI | 9 | 1 |
| VII | 5 | 2 |

MOLDING CONDITIONS

| Example No. | Press (p.s.i.) | Initial Temp. (° C.) | Heat up time (min.) | Max. Heat Temp., ° C. | Max. Heat Time, hr. | Cooling Temp., ° C. |
|---|---|---|---|---|---|---|
| IV | 30 | 60 | 15 | 162 | 1 | 80 |
| V | 30 | 60 | 18 | 162 | 1 | 80 |
| VI | 30 | 60 | 20 | 162 | 1 | 80 |
| VII | 30 | 60 | 20 | 162 | 1 | 80 |

RESIN CONTENT, PERCENT

| Example No. | Prepreg. | Laminate | Resin Loss on Molding |
|---|---|---|---|
| IV | 28.0 | 27.0 | 1.0 |
| V | 31.5 | 25.9 | 5.6 |
| VI | 42.5 | 30.0 | 12.5 |
| VII | 29.7 | 29.8 | 19.9 |

LAMINATE PROPERTIES AT 130° C.

| Example No. | Avg. Load, p.s.i. | Avg. Deflection, Inches |
|---|---|---|
| IV | 27,050 | 0.135 |
| V | 917 | 0.150 |
| VI | 37,950 | 0.134 |
| VII | 35,200 | 0.123 |

From the laminate properties at 130° C., it will be apparent that the laminates prepared according to this invention are surprisingly more rigid, have a higher degree of cure and a higher degree or density of cross-linking than laminates which employ either dicyandiamide or isophthalic dihydrazide alone as a curing or hardening agent. It is apparent from the foregoing results that the load-deflection or flexural strength characteristics of Examples VI and VII are superior to the same results on Examples IV and V. It is also apparent that the improvement is not merely additive in nature. An even greater improvement is noted at higher temperatures, as for example at 150° C.

While there has been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

We claim as our invention:

1. A liquid composition of matter comprising an admixture of a polyglycidyl ether of a polyhydric phenol, a hardening compound having the formula:

$$NH_2NHC(O)-R_n-C(O)-NHNH_2$$

wherein R is a divalent hydrocarbon radical selected from the group consisting of phenylene and alkylene radicals and $n$ is selected from the group consisting of zero and the integer 1, and dicyandiamide, the weight proportion of the hardening compound to dicyandiamide being in the range from 1:9 to 9:1.

2. A liquid composition of matter comprising an admixture of a liquid polyglycidyl ether of a polyhydric phenol having an epoxy equivalency of from about 100 to about 500, a hardening compound having the formula:

$$NH_2NHC(O)-R_n-C(O)-NHNH_2$$

wherein R is a divalent hydrocarbon radical selected from the group consisting of phenylene and alkylene radicals and $n$ is selected from the group consisting of zero and the integer 1, dicyandiamide and a finely divided filler material, the weight proportion of the hardening compound to dicyandiamide being in the range from 1:9 to 9:1.

3. A composition of matter comprising an admixture of a liquid polyglycidyl ether of a polyhydric phenol, isophthalic dihydrazide and dicyandiamide, the weight proportion of the dihydrazide to dicyandiamide being from 1:9 to 9:1.

4. A composition of matter comprising an admixture of a liquid polyglycidyl ether of a polyhydric phenol, sebacic dihydrazide and dicyandiamide, the weight proportion of the dihydrazide to dicyandiamide being from 1:9 to 9:1.

5. A composition of matter comprising an admixture of a liquid polyglycidyl ether of a polyhydric phenol, adipic dihydrazide and dicyandiamide, the weight proportion of the dihydrazide to dicyandiamide being from 1:9 to 9:1.

6. A composition of matter comprising the solid, insoluble and infusible reaction product of an admixture of a polyglycidyl ether of a polyhydric phenol, a hardening compound having the formula:

$$NH_2NHC(O)-R_n-C(O)-NHNH_2$$

wherein R is a divalent hydrocarbon radical selected from the group consisting of phenylene and alkylene radicals and $n$ is selected from the group consisting of zero and the integer 1 and dicyandiamide, the weight proportion of the hardening compound to dicyandiamide being in the range from 1:9 to 9:1.

7. A composition of matter comprising the solid, insoluble and infusible heat reaction product of an admixture of a viscous liquid polyglycidyl ether of a polyhydric phenol, sebacic dihydrazide and dicyandiamide, the weight proportion of the dihydrazide to dicyandiamide being from 1:9 to 9:1.

8. A composition of matter comprising the solid, insoluble and infusible heat reaction product of an admixture of a viscous liquid polyglycidyl ether of a polyhydric phenol, isophthalic dihydrazide and dicyandiamide, the weight proportion of the dihydrazide to dicyandiamide being from 1:9 to 9:1.

9. A composition of matter comprising the solid insoluble and infusible heat reaction product of an admixture of a viscous liquid polyglycidyl ether of a polyhydric phenol, adipic dihydrazide and dicyandiamide, the weight proportion of the dihydrazide to dicyandiamide being from 1:9 to 9:1.

References Cited by the Examiner

UNITED STATES PATENTS

| | | | |
|---|---|---|---|
| 2,847,395 | 8/1958 | Wear | 260—47 |
| 2,881,090 | 4/1959 | Reidl et al. | 260—47 |
| 3,028,342 | 4/1962 | Katz et al. | 260—47 |
| 3,030,247 | 4/1962 | Schurb | 260—47 |

OTHER REFERENCES

Grant: Hackh's Chemical Dictionary, 3rd ed., McGraw-Hill Book Co., Inc., 1944, page 310 relied on.

Lee et al., "Epoxy Resins," pages 234–236 relied on, McGraw-Hill Book Co., Inc., New York, 1957.

WILLIAM H. SHORT, *Primary Examiner.*

HAROLD N. BURSTEIN, LOUISE P. QUAST, A. L. LIBERMAN, T. D. KERWIN, *Assistant Examiners.*